United States Patent
Wertheimer et al.

(10) Patent No.: US 6,601,085 B1
(45) Date of Patent: Jul. 29, 2003

(54) COLLISION LIVE LOCK AVOIDANCE FOR MULTI-MAC CHIPS

(75) Inventors: Aviad J. Wertheimer, Zur Hadassa (IL); Benzi Ende, Maale Adumin (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/520,567

(22) Filed: Mar. 8, 2000

(51) Int. Cl.[7] .............................................. G06F 15/16
(52) U.S. Cl. ........................ 709/200; 709/228; 709/234; 709/235; 709/250; 370/347; 370/348
(58) Field of Search ................................. 709/200, 220, 709/225, 228, 234–235, 238, 250, 253; 370/252, 401, 445–448, 462–463

(56) References Cited

U.S. PATENT DOCUMENTS

| | | | | |
|---|---|---|---|---|
| 5,822,538 A | * | 10/1998 | Krishna et al. | 709/235 |
| 5,854,900 A | * | 12/1998 | Kalkunte et al. | 709/238 |
| 5,894,559 A | * | 4/1999 | Krishna et al. | 709/253 |
| 5,905,870 A | * | 5/1999 | Mangin et al. | 709/234 |
| 6,055,578 A | * | 4/2000 | Williams et al. | 709/253 |
| 6,078,591 A | * | 6/2000 | Kalkunte et al. | 370/348 |
| 6,339,788 B1 | * | 1/2002 | Geyer et al. | 709/220 |
| 6,345,310 B1 | * | 2/2002 | Allison et al. | 709/250 |

* cited by examiner

*Primary Examiner*—Bharat Barot
(74) *Attorney, Agent, or Firm*—Seth Z. Kalson (57) ABSTRACT

A multi-MAC chip for an Ethernet, the multi-MAC chip generating different random variables for each MAC layer so that each MAC has a distinct backoff interval when there is a collision. This avoids a possible live-lock state. In one embodiment, the random variables are generated by adding distinct numbers to a random variable generated according to the truncated binary exponential backoff algorithm. In another embodiment, each MAC stops a free-running counter for some specified number of clock cycles upon occurrence of a distinct event, and each counter for each colliding MAC is sampled upon a collision to provide random integers used to calculate backoff intervals for each colliding MAC.

16 Claims, 7 Drawing Sheets

COLLISION LIVE LOCK AVOIDANCE FOR MULTI-MAC CHIPS

FIELD OF INVENTION

The present invention relates to network communications, and more particularly, to multi-MAC chips used for an Ethernet network.

BACKGROUND

Figure 1:
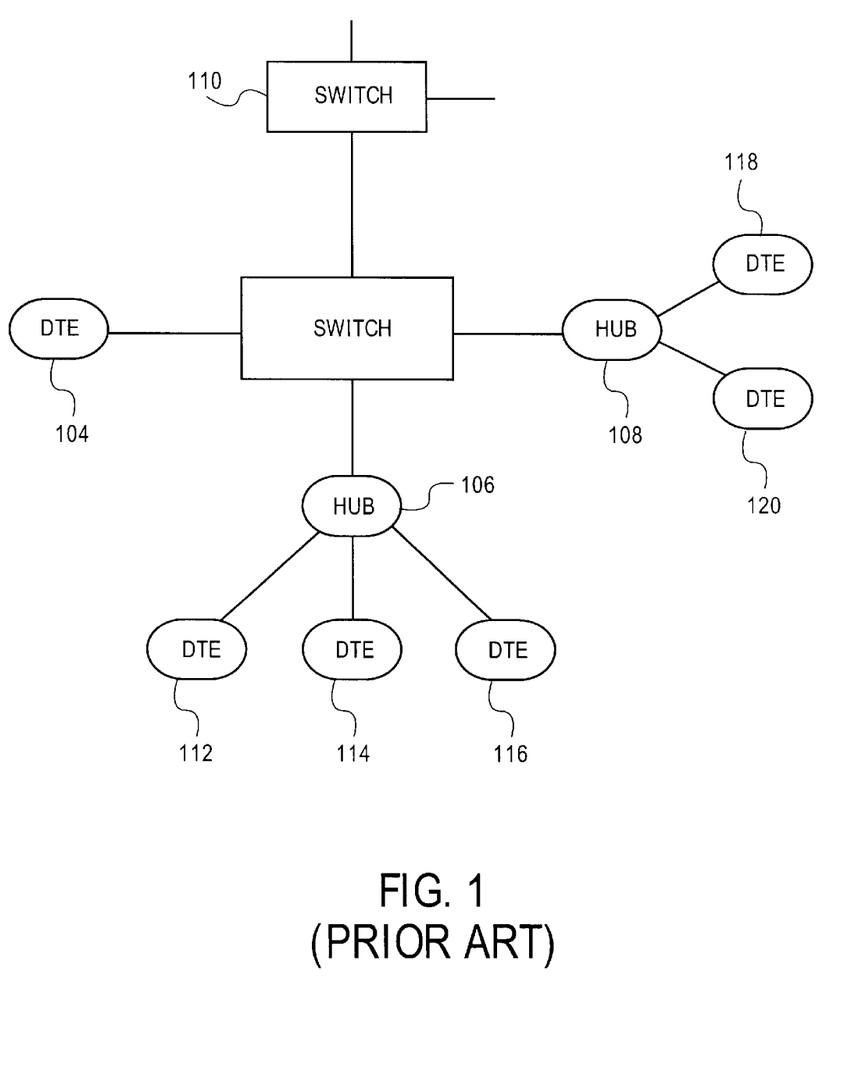
FIG. 1 illustrates a prior art Ethernet LAN.

A portion of an Ethernet LAN (Local Area Network) is illustrated in FIG. 1. Switch 102 is a four-port switch, with ports connected to DTE (Data Terminal Equipment) 104, Hub 106, Hub 108, and three-port switch 110. Connected to Hub 106 are DTE 112, DTE 114, and DTE 116, and connected to Hub 108 are DTE 118 and DTE 120. Data terminal equipment may be, for example, a workstation or server. A hub may be a half-duplex or full-duplex repeater. The connections to switch 110 are not shown for simplicity, but may be connected to other switches, hubs, DTE, or other intermediate network devices.

Figure 2:
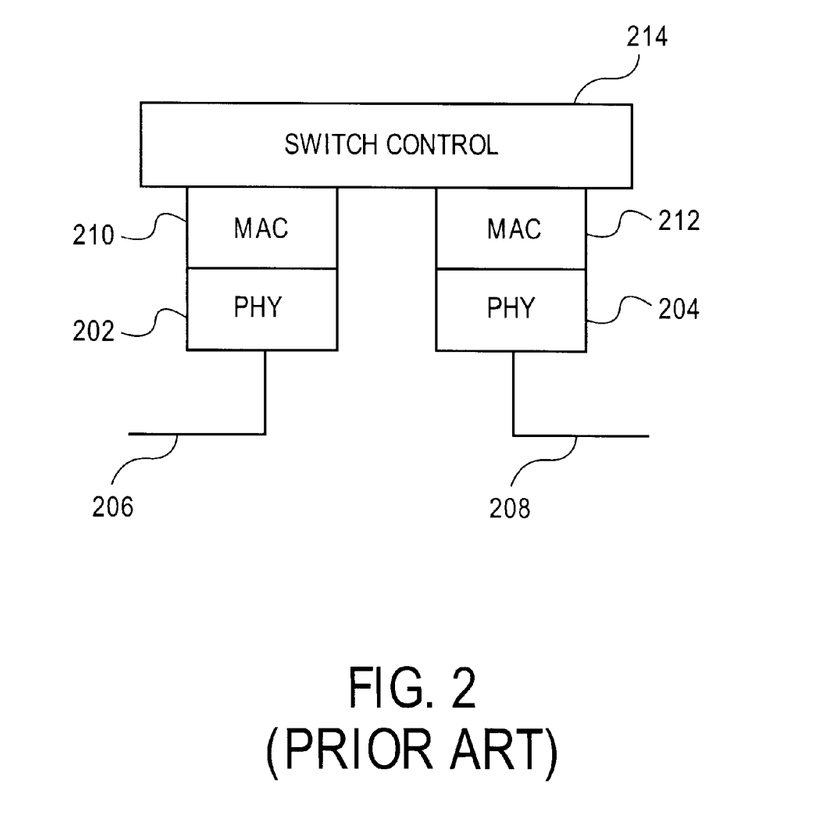
FIG. 2 models a prior art switch.

FIG. 2 illustrates a model of a switch. For simplicity, only two ports are indicated, where PHY (Physical Layer) 202 and PHY 204 are connected, respectively, to links 206 and 208. The conceptual layers immediately above PHY 202 and PHY 204, respectively, are MAC (Media Access Control) 210 and MAC 212. Switch control layer 214 communicates with the MAC layers and routes received MAC frames to their appropriate MAC layers for transmission on the appropriate port. See IEEE (Institute of Electrical and Electronic Engineers) standard 802.3 for definitions of the various protocol layers.

For an Ethernet, when a collision is detected by a MAC while transmitting a frame, it interrupts transmission of the frame and causes a JAM signal to be transmitted so that all other MACs on the shared medium are notified that a collision has occurred. The MAC will retry transmission of the interrupted frame until transmission is successful or a maximum number of attempts (attemptLimit) have been made. All attempts at. transmitting an interrupted frame are made before transmitting any subsequent outgoing frame.

Retransmission of an interrupted frame is scheduled by a random process known as a truncated binary exponential backoff. The MAC enters a delay period after it has sent the last jam bit, where the delay is an integral multiple of slotTime. The number of slotTimes in the delay before the $n^{th}$ retransmission attempt is the random variable r, where r is an integer-valued-random variable uniformly distributed within the range $$0 \leq r < 2^k,$$

where $$k = \min(n, 10).$$

Figure 3:
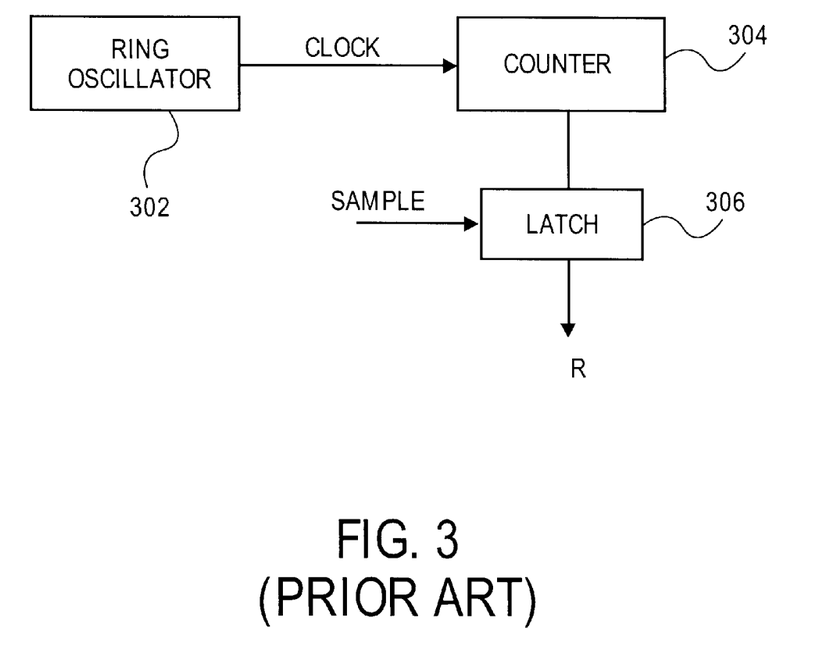
FIG. 3 models a prior art method for generating a random variable according to the truncated binary exponential backoff algorithm to provide a MAC backoff interval.

A method for generating realizations of the random variable r is illustrated in FIG. 3. Ring oscillator 302 provides a clock signal to free-running counter 304. Ring oscillator 302 is designed so that its frequency, and hence the clock signal used to clock counter 304, is a function of temperature or other environmental factors. Counter 304 is sampled and latched by latch 306 when a collision is detected. Any chosen k bits of latch 306 provide a realization of the random variable r.

Some switches use multi-MAC chips, in which two or more MACs are integrated on the same die. Furthermore, some hubs may also employ multiple MAC layers integrated on the same die, such as full-duplex hubs. It may happen, perhaps inadvertently, that two or more MACs on the same multi-MAC chip are connected to the same network segment. Or perhaps there is a path connecting one MAC on a multi-MAC chip to another MAC on the same multi-MAC chip. In such a situation, one MAC on a multi-MAC chip may cause a transmission collision with another MAC on the same multi-MAC chip.

For prior art multi-chip MACs utilizing one oscillator, the random variables generated for each MAC will be the same. For multi-chip MACs utilizing more than one oscillator, each oscillator experiences essentially the same environmental factors, and consequently the random variables generated by each MAC will be correlated. In the worst case, the randomly generated integers will be the same. Correlated random variables among colliding MACs reduce the effectiveness of the truncated binary exponential backoff algorithm. In particular, when the generated random variables are the same, colliding MACs will enter a live-lock situation when they cause collision, because each colliding MAC will retry transmission at the same time, until attemptLimit is reached, in which case an error indication is provided to a higher layer. There is thus a need to address the problem of live-lock in a multi-MAC chip.

DESCRIPTION OF THE EMBODIMENTS

Figure 4:
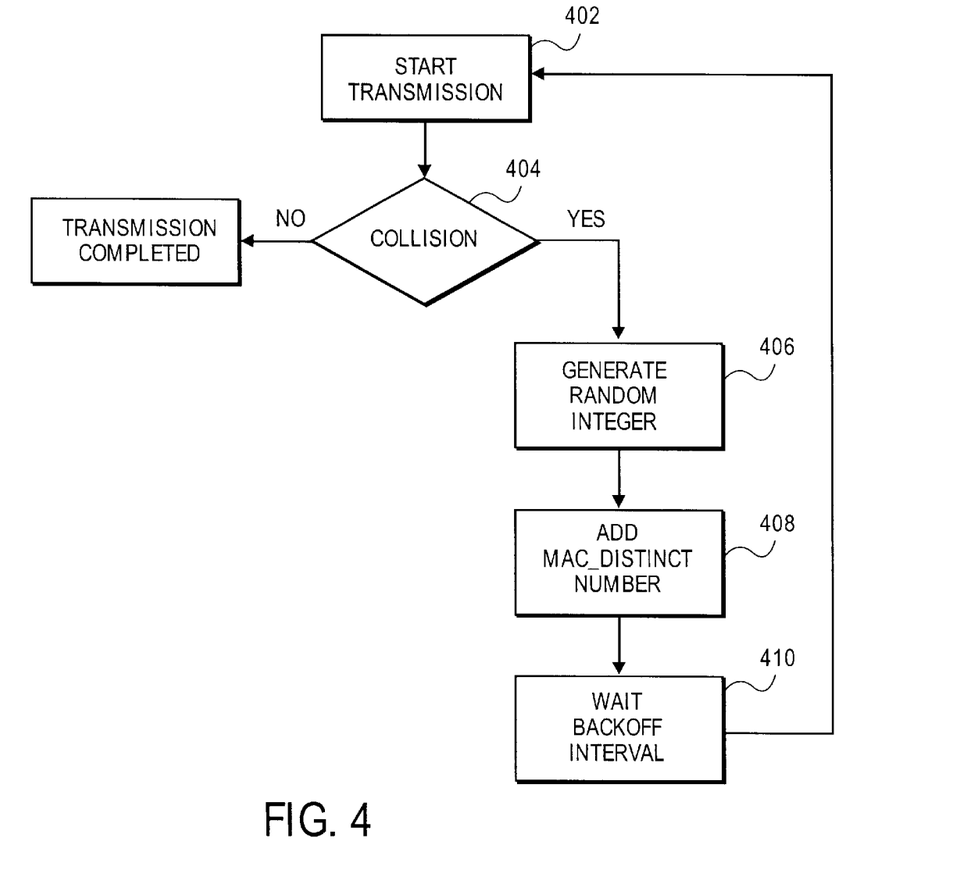
FIG. 4 is a flow diagram for generating a random variable to provide a MAC backoff interval according to an embodiment of the present invention.

One method for generating random variables on a Multi-MAC chip is provided in FIG. 4. Frame transmission is started in step 402. If during frame transmission a collision is detected in step 404, a random integer according to the truncated binary exponential backoff algorithm is generated in step 406. In step 408, an integer number is added to this random integer to provide a new random integer. This integer number is distinct for each MAC on a multi-MAC chip, so that the resulting generated random integers are distinct. The backoff time interval is then obtained by multiplying the new random integer by slotTime, and the MAC waits for the backoff interval time as indicated in step 410 before retrying transmission in step 402.

Figure 5:
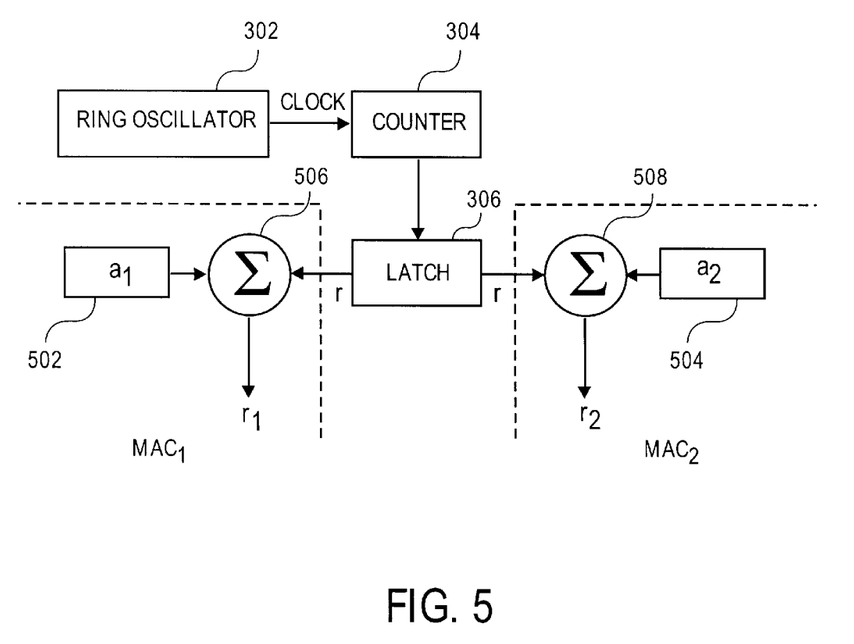
FIG. 5 is a high-level apparatus architecture according to the embodiment of FIG. 4.

FIG. 5 provides a high-level model of a multi-MAC chip employing the method of FIG. 4, where for simplicity only two MACs, $MAC_1$ and $MAC_2$, are shown. Associated with $MAC_1$ is register 502 for storing a number $a_1$, and associated with $MAC_2$ is register 504 for storing a number $a_2$, where $a_1 \neq a_2$. When latch 306 is sampled during a collision, adders 506 and 508 associated with each MAC add the stored distinct numbers to the random variable r to obtain the new random variables $r_1$ and $r_2$, which are used to provide a unique backoff interval for each MAC as described in connection with FIG. 4. In some embodiments, only one time-multiplexed adder may be needed to perform the addition.

In some embodiments, the distinct numbers stored for each MAC may be generated by the operating system or device driver, or perhaps provided as input by a system administrator. For other embodiments, the distinct numbers may be a function of each MAC address, or based upon a random event distinct for each MAC, such as the number of octets transmitted by each MAC over some time interval.

Figure 6:
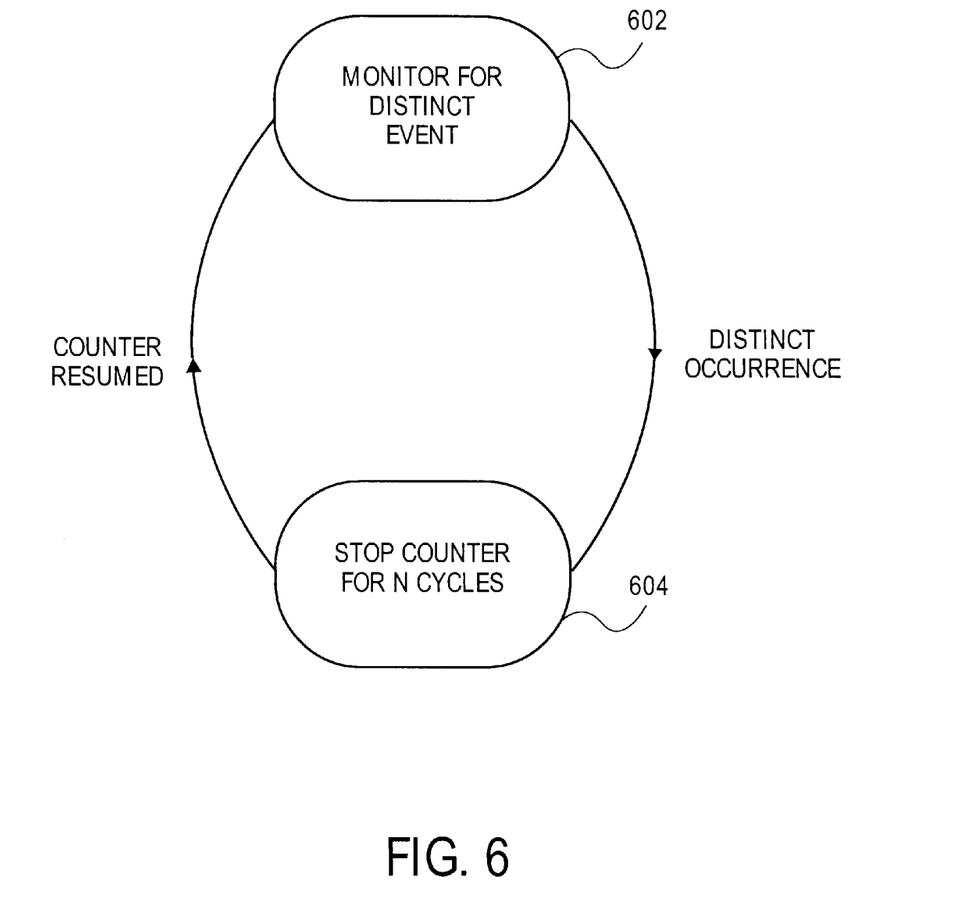
FIG. 6 is a state diagram for generating a random variable to provide a MAC backoff interval according to another embodiment of the present invention.

Another embodiment for generating random variables in a multi-MAC chip is provided in FIG. 6. Associated with each MAC is a counter clocked by a noisy oscillator. FIG. 6 shows a state diagram for each MAC in the multi-MAC chip. While in state 602, a MAC monitors for the occurrence of an event distinct for that MAC. For example, such an event for a MAC may be the transmission of a block of M octets by the MAC, where M is some pre-assigned number. When the event occurs, the MAC experiencing the event moves to state 604, whereby its associated counter is stopped for N cycles, where N is some pre-assigned number. After N cycles, the counter resumes being clocked and the state moves to state 602 again. As before, when a collision is detected by a MAC, its associated counter is latched and sampled to provide a k bit random integer, and the backoff interval for the MAC is obtained by multiplying slotTime by the k bit random integer. Because the events for each MAC are uncorrelated, the backoff intervals for colliding MACs are also uncorrelated, and live-lock is avoided.

Figure 7:
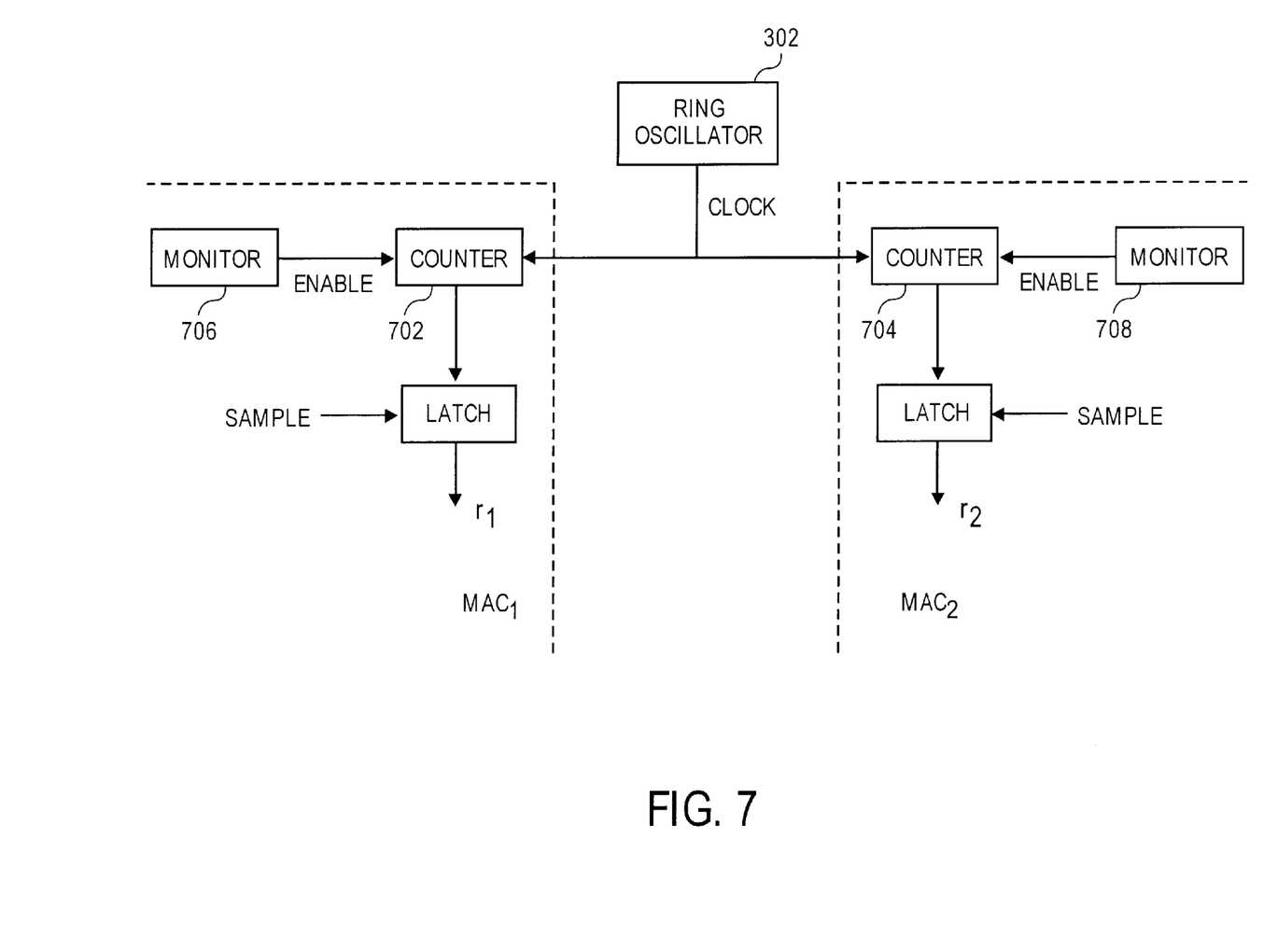
FIG. 7 is a high-level apparatus architecture according to the embodiment of FIG. 6.

A high-level model of a multi-MAC chip employing the method of FIG. 6 is provided in FIG. 7, where for simplicity only two MACs, $MAC_1$ and $MAC_2$, are indicated. Associated with $MAC_1$ and $MAC_2$ are, respectively, free-running counter 702 and free-running counter 704. Monitor functional blocks 706 and 708 monitor, respectively, a pre-assigned distinct event for each MAC. When a distinct event is detected by monitor 706 for $MAC_1$, counter 702 is stopped for $N_1$ cycles, and then it is enabled again to be clocked by ring oscillator 302. Similarly, when a distinct event is detected by monitor 708 for $MAC_2$, counter 704 is stopped for $N_2$ cycles, and then it is enabled again to be clocked by ring oscillator 302. It is not necessary for $N_1 \neq N_2$.

Various modifications may be made to the disclosed embodiments without departing from the scope of the invention as claimed below.

What is claimed is:

1. A multi-MAC chip comprising:
   a first MAC;
   a second MAC;
   at least one counter to generate a first random variable for the first MAC and a second random variable for the second MAC;
   a first register to store a first number;
   a second register to store a second number distinct form the first number;
   at least one summer to sum the first number with the first random variable to provide a first new random variable and to sum the second number with the second random variable to provide a second new random variable; and
   wherein if the first MAC and the second MAC detect a collision, the first and second new random variables are to provide, respectively, a first backoff time interval for the first MAC and a second backoff time interval for the second MAC.

2. The multi-MAC chip as set forth in claim 1, wherein the first and second random variables are equal to each other.

3. The multi-MAC chip as set forth in claim 1, wherein the first and second random variables are generated according to a truncated binary exponential backoff algorithm.

4. The multi-MAC chip as set forth in claim 3, wherein the first and second random variables are equal to each other.

5. A method to provide a first backoff time interval for a first MAC and a second backoff time interval for a second MAC, the method comprising:
   generating a first random variable and a second random variable;
   adding a first number to the first random variable to provide a first new random variable;
   adding a second number to the second random variable to provide a second new random variable, wherein the first and second numbers are not equal to each other;
   generating a first backoff interval for the first MAC based upon multiplying the first new random variable with a slotTime; and
   generating a second backoff interval for the second MAC based upon multiplying the second new random variable with the slotTime.

6. The method as set forth in claim 5, wherein the first and second random variables are equal to each other.

7. The method as set forth in claim 5, wherein the first and second random variables are generated according to a truncated binary exponential backoff algorithm.

8. The method as set forth in claim 7, wherein the first and second random variables are equal to each other.

9. A multi-MAC chip comprising:
   a first MAC;
   a second MAC;
   a first free-running counter;
   a second free-running counter;
   a first monitor functional unit to detect an event associated with the. first MAC, and coupled to the first free-running counter to disable the first free-running counter for $N_1$ clock cycles upon detection of the event associated with the first MAC; and
   a second monitor functional unit to detect an event associated with the second MAC, and coupled to the second free-running counter to disable the second free-running counter for $N_2$ clock cycles upon detection of the event associated with the second MAC.

10. The multi-MAC chip as set forth in claim 9, wherein $N_1 = N_2$.

11. The multi-MAC chip as set forth in claim 9, further comprising:
   a first latch to latch $k_1$ bits of the first free-running counter upon the first MAC detecting a collision so as to provide a first backoff time interval for the first MAC; and
   a second latch to latch $k_2$ bits of the second free-running counter upon the second MAC detecting a collision so as to provide a second backoff time interval for the second MAC.

12. The multi-MAC chip as set forth in claim 11, wherein $n_1$ is the number of retransmission attempts of the first MAC and $n_2$ is the number of retransmission attempts of the second MAC, wherein $$k_1 = \min(n_1, 10),$$

and $$k_2 = \min(n_2, 10).$$

13. A method to provide a first backoff time interval for a first MAC and a second backoff time interval for a second MAC, the method comprising:

running a first counter;

running a second counter;

stopping the first counter for $N_1$ clock cycles upon occurrence of an event associated with the first MAC; and stopping the second counter for $N_2$ clock cycles upon occurrence of an event associated with the second MAC.

14. The method as set forth in claim 13, wherein $N_1=N_2$.

15. The method as set forth in claim 13, further comprising the steps of:

latching $k_1$ bits of the first counter upon the first MAC detecting a collision to generate a first random variable;

latching $k_2$ bits of the second counter upon the second MAC detecting a collision to generate a second random variable;

generating the first backoff time interval by multiplying the first random variable by a slotTime; and generating the second backoff time interval by multiplying the second random variable by the slotTime.

16. The method as set forth in claim 15, wherein $n_1$ is the number of retransmission attempts of the first MAC and $n_2$ is the number of retransmission attempts of the second MAC, wherein $$k_1=\min(n_1,10),$$

and $$k_2=\min(n_2,10).$$

* * * * *